Sept. 15, 1964     W. R. LAURIE     3,148,459
READING ANALYZER
Filed Oct. 11, 1961     5 Sheets-Sheet 1
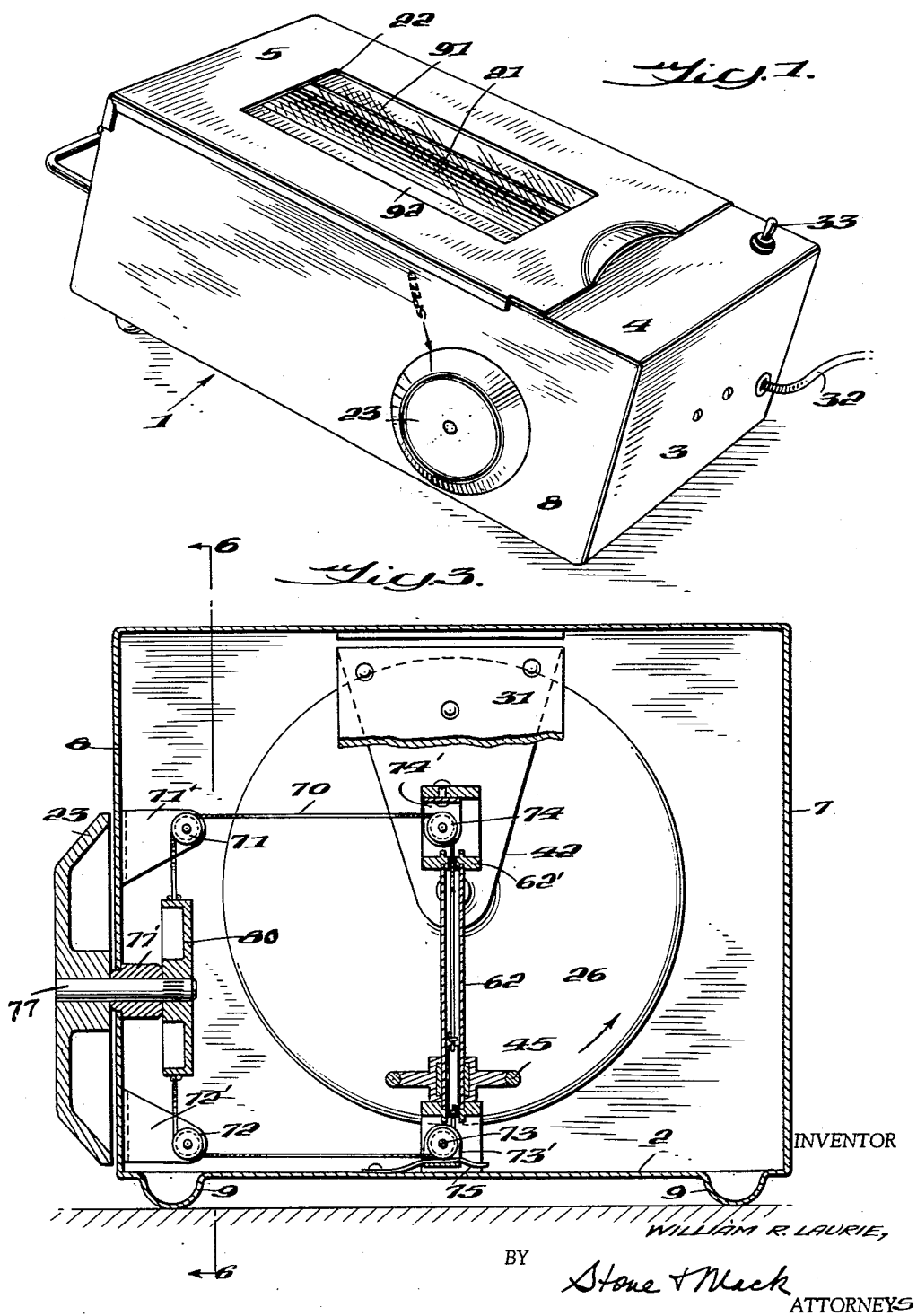
INVENTOR
WILLIAM R. LAURIE,
BY Stone + Mack
ATTORNEYS

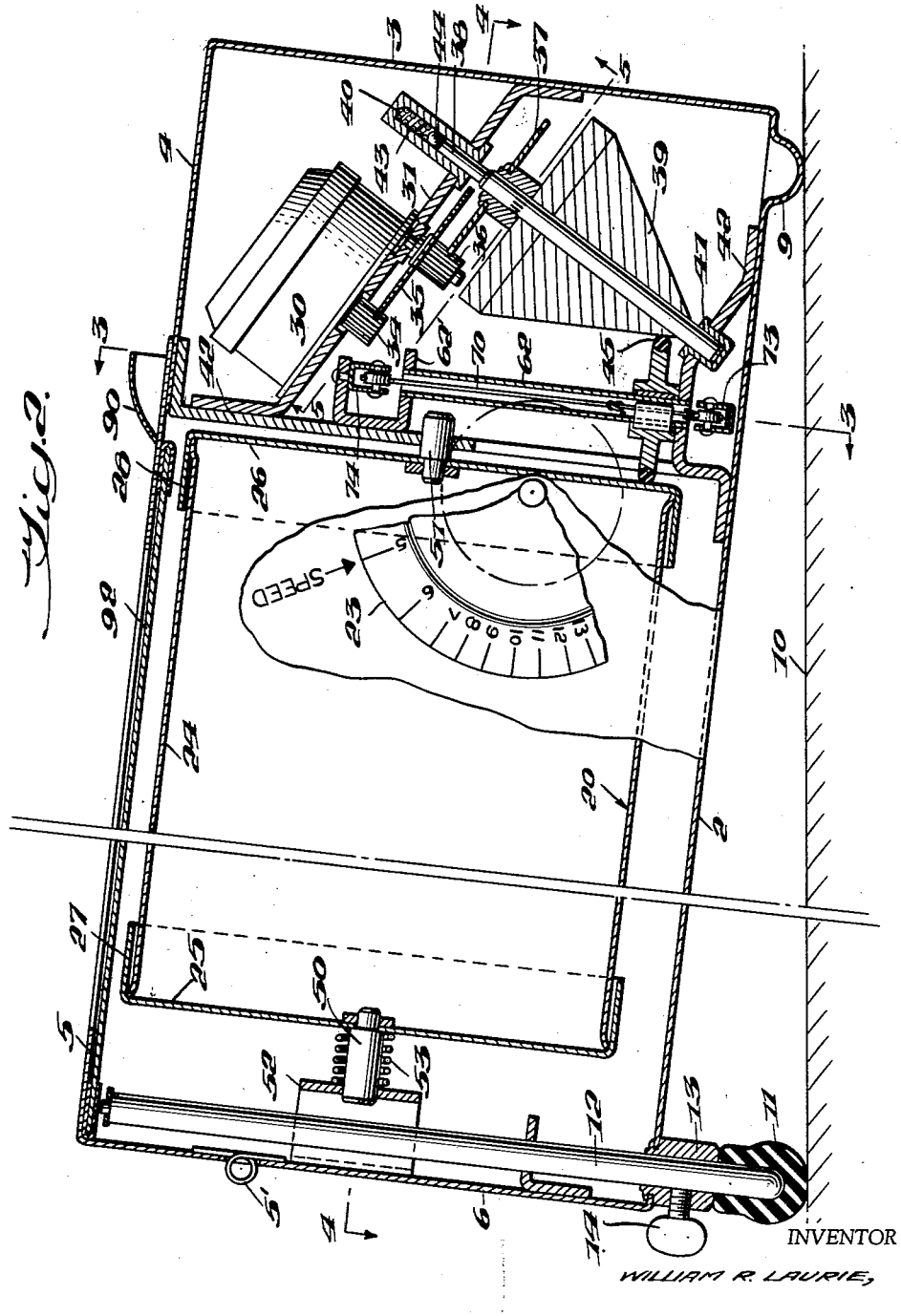

Sept. 15, 1964 W. R. LAURIE 3,148,459
READING ANALYZER
Filed Oct. 11, 1961 5 Sheets-Sheet 3

INVENTOR
WILLIAM R. LAURIE,
BY Stone & Mack
ATTORNEYS

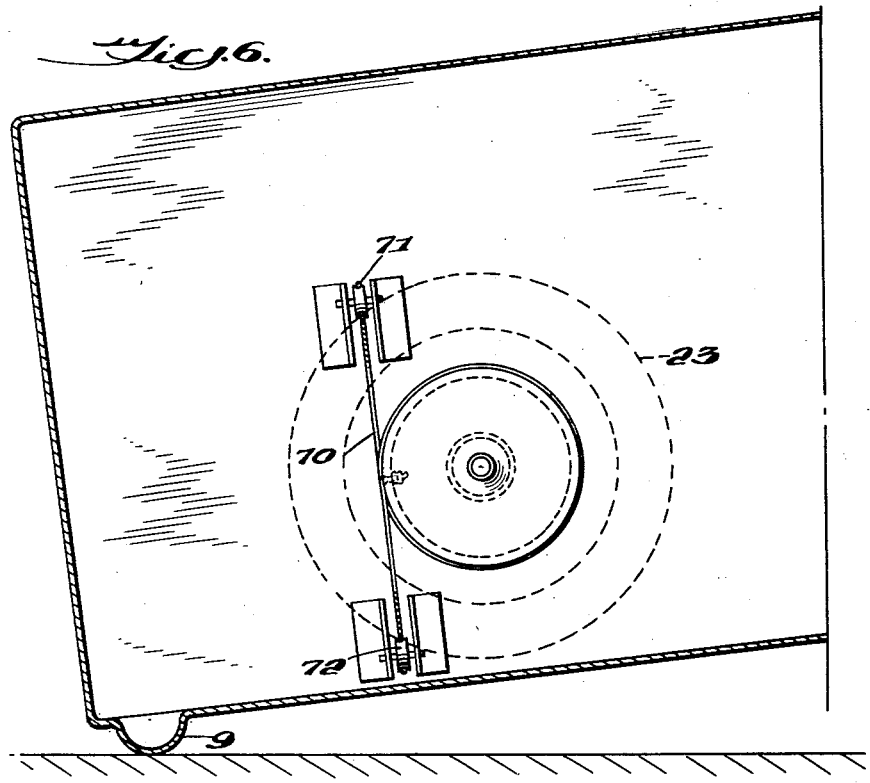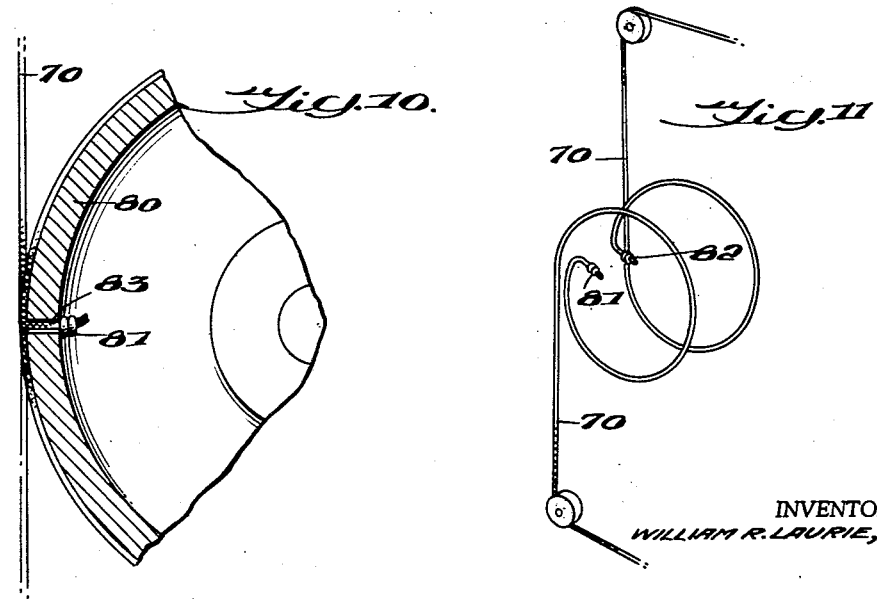

Sept. 15, 1964 W. R. LAURIE 3,148,459
READING ANALYZER
Filed Oct. 11, 1961 5 Sheets-Sheet 5
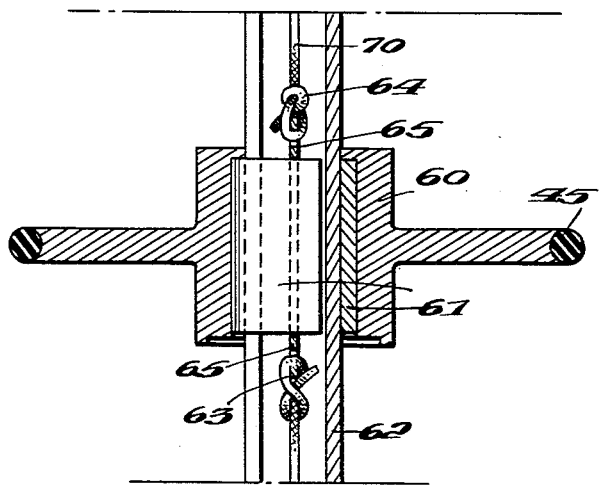
Fig. 7.
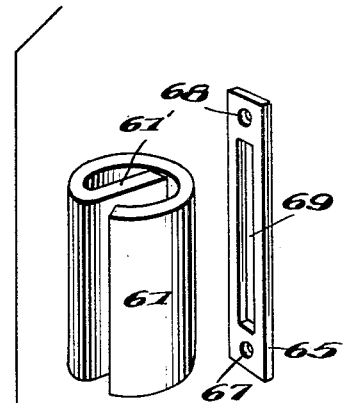
Fig. 9.
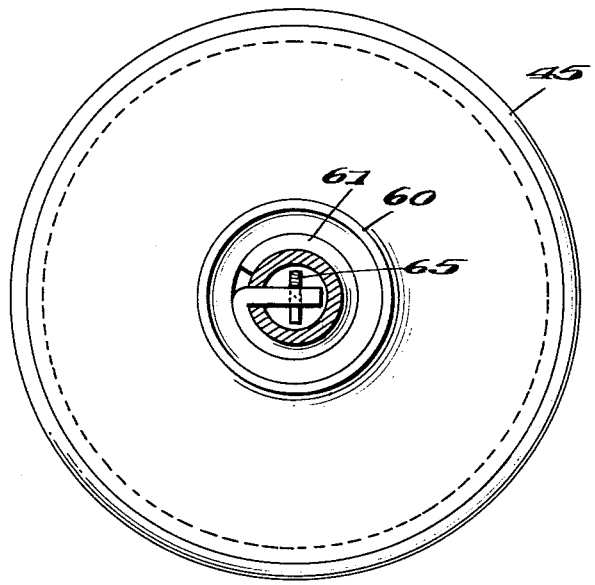
Fig. 8.
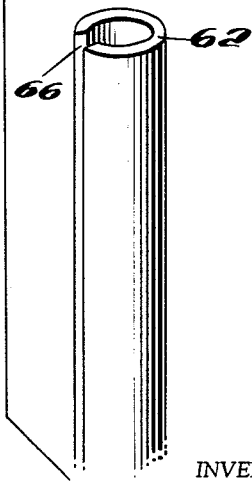
INVENTOR
WILLIAM R. LAURIE,
BY *Stone & Mack*.
ATTORNEYS

United States Patent Office 3,148,459
Patented Sept. 15, 1964

3,148,459
READING ANALYZER
William R. Laurie, Fort Lauderdale, Fla., assignor to The Mills Center, Inc., Fort Lauderdale, Fla., a corporation of Florida
Filed Oct. 11, 1961, Ser. No. 144,363
3 Claims. (Cl. 35—35)

This invention relates to an improvement in reading-training or in reading analyzer devices. The invention is more particularly concerned with devices for improving reading speed. The unique and novel feature about the machine is a reading analyzer in which the reading material is rotated on a drum in a counter-clockwise direction so that the material may be viewed through a window of adjustable dimensions placed in the front of the enclosure of the analyzer. The unique and novel development in the art is to cause the eyes to remain in a relatively fixed position. The purpose, basically, is to get the reader to eliminate eye movement while using the machine to expand horizontally the reader's area of fixation. Research has indicated that such training reduces the number of eye movements of a reader in normal reading and increases the number of words that the reader can comprehend in one fixation of the eyes.

What is believed to be an established technique in the promotion of reading efficiency is to continuously cover the material being read with a mask or shutter in order to aid the inefficient reader to become accomplished in absorbing and understanding printed material upon a single perusal thereof. The present applicant, however, believes and has demonstrated that if reading actually takes place there is no need to provide a bar, a mask or a shutter to cover up successive lines of reading material. But if the material has not been read, that is, observed and understood, keeping one from going over the material again so it could be read could be psychologically and educationally detrimental to the reader.

Applicant's device is so constructed that the material being read is masked off vertically instead of horizontally, thereby enabling the reader to go over the material again that was not understood the first time.

The device disclosed herein is designed basically for use individually rather than for group work. The person operating the device will be able to regulate its speed so that the reading materials being presented can be assimilated by the operator. The cylinder, upon which the reading material is placed, turns in a counter-clockwise direction, and since the material is placed around the cylinder, the material moves in a counterclockwise direction also. The operator using this device will not move his eyes from left to right as is done in normal reading practice.

The device lends itself to the presentation of all types of educational reading material; for example educational materials dealing with speed, vocabulary skills, word attack skills, or comprehension of reading can be presented to an operator over a period of time, and the operator will become more proficient in these areas.

The present applicant feels that inefficient readers go over reading material again for the purpose of reading because they do not understand the full meaning of the individual words on the page, or possess a lack of skills to decipher the words, or the ability to understand the concepts that the individual words as a group are trying to convey. Most of the devices of the prior art are so constructed that the operator must move his eyes along the printed page from left to right and from the right end of one line to the beginning end of the succeeding line, but in the device of the present invention, because of the counter-clockwise movement of the reading material, the operator is relieved of the necessity of moving his eyes from left to right. The only movement the operator makes is to drop his vision to the succeeding line after one complete rotation of the cylinder. Research has determined that even though the present device eliminates the left-right movement of the operator's eyes, it does not tend to inhibit the same movements on materials used without this device. On the contrary, research has shown that this device is extremely helpful in increasing one's rate of reading if suitable reading materials are employed.

One of the objects of this invention is to provide means for developing higher effective reading rates. Another object of the invention is to provide an apparatus in which the reading matter is exposed to view instead of being partly hidden as in some prior devices.

Other objects will become apparent to those skilled in the art when the following description is read in connection with the accompanying drawings.

Referring to the drawings:

FIGURE 1 is a perspective view of the reading analyzer embodying the invention;

FIGURE 2 is a vertical sectional view of the reading analyzer, a portion thereof being shown in full elevation;

FIGURE 3 is a transverse sectional view taken along the line 3—3 of FIGURE 2 in the direction of the arrows;

FIGURE 6 is an enlarged fragmentary sectional view of the analyzer taken along the line 6—6 of FIGURE 3, in the direction of the arrows;

FIGURE 7 is an enlarged fragmentary sectional view of the idler wheel depicting the mode of attaching the dial cord thereto;

FIGURE 8 is a bottom view of FIGURE 7;

FIGURE 9 is an exploded view showing the nylon bearing, dial cord attaching means and slotted metal tube shown in FIGURE 7;

FIGURE 10 is a fragmentary section of the dial pulley showing the manner of attaching the dial cord thereto, and FIGURE 11 shows the manner in which the dial cord is associated with the dial pulley and the cord pulleys.

Figure 4:
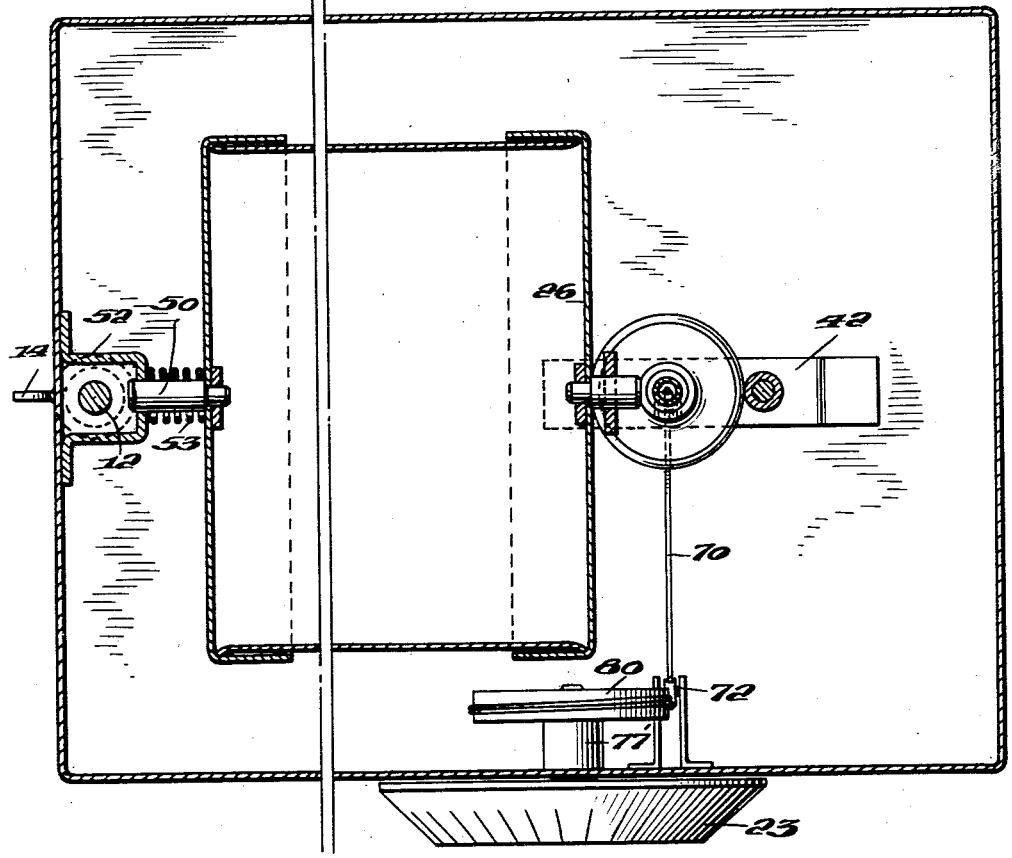
FIGURE 4 is a horizontal sectional view taken along the line 4—4 of FIGURE 2 in the direction of the arrows.
Figure 5:
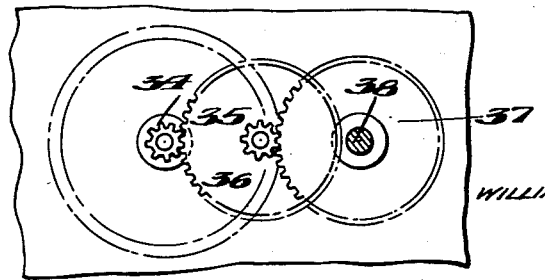
FIGURE 5 is a sectional view taken along the line 5—5 of FIGURE 2 in the direction of the arrows.

In the illustrative embodiment of this invention shown in the drawings, 1 represents the machine of the character described. The casing with which the machine is provided comprises a bottom 2, a front panel 3, a top panel 4, a hinged top portion 5, a rear panel 6, a side panel 7 and another side panel 8. This casing performs no mechanical function other than to provide a means for supporting the mechanism within the casing. The casing is provided with supporting feet 9,9 which are integral with the bottom panel 2 and rest upon the table surface 10. For the purpose of providing a sloping attitude to the machine an adjustable leg 11 is provided, said leg forming the terminus of a rod 12 suitably slidably supported within the casing, as shown, and adjustably secured by means of the bearing 13 and set screw 14. Preferably there is but one such adjustable leg and this is mounted so as to coincide with the longitudinal axis of the machine; see FIGURE 4.

As previously set forth, the unique and novel feature about this machine is that the reading material is placed upon a rotating drum, which drum rotates in a counter-clockwise direction so that the material may be viewed through a window of adjustable dimensions placed in the front of the hinged top portion of the casing.

The purpose of the mechanical drive system more clearly shown in FIGURE 2 is to rotate a drum 20 to which printed or other material 21 is affixed, at a constant and accurate speed, so that this material may be viewed through a window 22 of adjustable dimensions which window is in the hinged top portion 5. The speed at which the drum 20 revolves is continuously variable through the range of one (1) revolution per minute to twenty five (25) revolutions per minute by means of a calibrated dial 23.

The drum 20 is of cylindrical form and constructed of some suitable light weight metal. It may be hollow or solid but a hollow form is preferred. The drum consists of a cylindrical wall portion 24 to which are secured end portions 25 and 26 which end portions are provided with integral overhanging portions 27 and 28 which are spaced from the wall portion 24, as shown, thereby providing open spaces into which the marginal edge portions of reading material may be inserted and fitted around the cylindrical wall portion 24. Such reading material generally consists of matter placed on legal size paper, that is, 8½ by 14 inches; but the drum can accept pieces of paper that are shorter in length as long as the width is approximately 8½ inches. The reason that the device has been constructed to accommodate legal size paper is that most schools stock or have at their disposal quantities of legal size paper to be used for reproducing materials suitable for the students. The applicant feels that the more directly involved the operator is in making the materials he is to use on this machine, the more benefit he will derive from their use. Some of the materials that have been employed are (1) Materials that aid beginning readers in the learning of consonants, consonant blends, long and short vowels, and other pertinent phases of word attack skills.

(2) Passages of written material constructed at various levels so as to aid the operator of the machine in the comprehension of written material.

(3) Materials which would aid in the building of vocabulary skills.

(4) Addition and subtraction combinations and multiplication tables.

The heart of the drive system is a high torque four hundred (400) revolutions per minute synchronous motor 30 secured to the motor plate 31. The motor plate is firmly secured to end panel 3 and main support plate 42. The motor derives its electrical energy from a source (not shown) through the cable 32 in circuit with an "on" and "off" switch 33, in the conventional manner. The output shaft of motor 30 has pressed thereon a pinion 34 which drives a gear 35 staked to a pinion 36. This combination of elements drives a gear 37 which is affixed to the drive shaft 38 and drive cone 39, which cone revolves at ten (10) revolutions per minute in a thrust bearing 40 and lower bearing 41, which bearing is staked to the main support plate 42. Downward thrust is maintained by coil spring 43 and ball bearing 44, thereby providing a constant friction between the surface of the drive cone 39 and the rubber covered idler wheel 45.

The drum 20 is supported by a shaft 50 affixed to end portion 25 and by a shaft 51 affxed to end portion 26. The shaft 51 revolves in a bearing hole provided in the main support plate 42 and the shaft 50 revolves in the bearing bracket 52. The end portion 26 maintains constant frictional contact with the idler wheel 45 by virtue of the pressure provided by the coil spring 53. Thus power is transmitted from the motor, through the gear train to the cone which revolves at a constant speed of ten (10) revolutions per minute. The cone 39 is a right circular cone as is common in cone drives, describing a solid of revolution about the apex of a straight line. The speed imparted to the cone is then transmitted to the drum through the medium of the idler wheel. Should the rubber idler wheel be located so that it engages with the same diameter on both the cone and the drum end portion, the speed ratio between the cone and the drum will be 1:1, and the drum will revolve at ten (10) revolutions per minute. By providing for the linear movement of the idler wheel, a variable speed ratio between the cone and the drum can be accomplished.

The hub 60 of the idler wheel 45 contains a nylon bearing 61 of the configuration shown in FIGURES 8 and 9 and is keyed to and is adapted to ride up and down on a slotted brass tube 62, as clearly shown in FIGURES 7, 8 and 9. This brass tube is secured at its bottom end to the main support plate 42 and at its upper end to a bracket 62' shaped as shown in FIGURE 2, said bracket 62' being secured to the main support bracket 42 in the region above the drum bearing provided for shaft 51.

As shown in FIGURES 7 and 8, the nylon bearing carries a member 65 to which member are secured the respective ends of the dial cord. The member 65 is provided at each end thereof with holes 67 and 68 which lie upon a longitudinal axis common with that of a slot 69, the slot being as long as the nylon bearing 61 is long. The member 65 is adapted therefore to fit over the portion 61' of the bearing 61. To the member 65 the dial cord is secured by knots 63 and 64 and the cord is centrally disposed with reference to the tube 62. The portion 61' slidingly fits into the slot 66 and the bearing 61 thus embraces the tube 62 and is adapted to slide thereon.

The dial cord 70 passes around four pulleys 71, 72, 73 and 74 as shown clearly in FIGURE 3, said pulleys 71, 72 and 74 being fixedly mounted upon brackets 71', 72', 74'. Pulley 73 is mounted on bracket 73' which is movable slightly up and down against the tension of spring 75. Tension on the dial cord 70 is thus maintained in a substantial manner. The dial cord 70 is connected to the dial pulley 80 by knots 81 and 82 in the cord. A narrow slot 83 is cut across the face of the dial pulley 80. The two ends of the cord 70 are knotted at 81 and 82 and passed around the four pulleys 71, 72, 73 and 74. The two ends are then wrapped around the dial pulley and the knots 81 and 82 are inserted into the slot 83, the width of the slot being such that the knots will not pull through. FIGURE 11 is a diagrammatic representation of the course taken by the dial cord 70 with respect to the pulleys and the dial pulley. The dial pulley 80 is staked to a dial pulley shaft 77 which shaft is journaled in a bearing 77' attached to panel 8. The dial 23 is secured to shaft 77 by means of a set screw or other means, but the dial must be adjustable for calibration purposes. As indicated in FIGURE 2, the dial is calibrated in terms of speed and, as shown, such speeds run from five to thirteen revolutions per minute but the complete range of speed preferably runs to twenty-five revolutions per minute and in practice the dial is so calibrated. Linear motion of the idler wheel with respect to the driving cone and the tube 62 is then transmitted by manual rotation of the calibrated dial. Rotating the dial in one direction causes the idler wheel to move towards the large diameter of the cone, thereby increasing the speed of the drum, due to a combination of increased surface speed of the idler wheel and decreased diameter of the drum surface. Conversely, rotating the dial in the opposite direction causes the idler wheel to move toward the small diameter of the cone, reducing its surface speed, and also engaging a larger diameter on the drum, thus reducing the speed of the drum. The friction present in the dial system is sufficient to prevent the idler wheel from shifting location on its own.

Viewing the device as seen in FIGURE 3, the power unit above described is so constructed and arranged that it will turn the drum 20 in a counter-clockwise direction from a theoretical zero revolution per minute to substantially twenty-five revolutions per minute, and since the drum 20 carries the reading material, said reading material will be presented to the operator or examinee in a counter-clockwise manner, that is, from right to left in FIGURE 1.

As previously set forth, the device is so constructed that the material being read is masked off vertically instead of horizontally, thereby enabling the reader to go over the material again that was not understood the first time. To that end, the top portion 5 of the casing which is hinged at 5' and with a hand lifting portion 90 is provided with a window 22. The vertical dimension of this window remains the same throughout the reading operation but the horizontal dimension of the window may be varied by horizontally disposed shutters 91 and 92 which are secured to the underside face of top portion 5 by means of an extra panel providing tracks in which the shutters may slide horizontally; see FIGURE 2. These shutters 91 and 92 can be opened in varying degrees from completely closed to completely open positions so as to gradually increase the eye fixations of the operator of the machine. Thus there has been provided a reading analyzer in which the reading material is rotated on a drum in a counter-clockwise direction so that the material may be viewed through a window of adjustable dimensions placed in the front of the enclosure of the analyzer, thereby causing the eyes to remain in a relatively fixed position and eliminating eye movements while using the analyzer, thus expanding horizontally the reader's area of fixation. This device will reduce the number of eye movements of a reader in normal reading and will increase the number of words that the reader can comprehend in one fixation of the eyes.

What is claimed is:

1. In a device for improving reading speed, in combination, means for feeding a writing past a viewing zone which is capable of being masked off vertically only, thereby enabling the reader to go over the writing again should it not have been understood the first time, said feeding means being a cylindrical drum on the cylindrical surface of which the writing is secured, said viewing zone being juxtaposed above the cylindrical drum in the form of a window across which a pair of shutters may be drawn to provide said masked-off vertical zone, means coupled to said feeding means operable to rotate said feeding means at a manually variable speed in a counter-clockwise direction with respect to said viewing zone and including a cone member and a manually variable idler wheel in frictional engagement with said cone member rotating at constant speed, said idler wheel having one portion of the periphery thereof in contact with said drum and another portion of the periphery thereof in contact with the surface of said cone, said idler wheel being mounted on an axis perpendicular with the longitudinal axis of the drum, said cone being mounted on an axis such that contact between the cone and the idler wheel is maintained in all positions of the idler wheel on its axis.

2. The device of claim 1 in which the idler wheel is moved linearly on its axis in either direction by means of a manually variable dial which upon rotation actuates means connected to said idler wheel.

3. The device of claim 2 in which the means connected to said idler wheel is a cord and pulley system.

References Cited in the file of this patent

UNITED STATES PATENTS

| | | |
|---|---|---|
| 1,344,642 | Lo Casto | June 29, 1920 |
| 2,691,831 | Jordan | Oct. 19, 1954 |
| 2,915,833 | Genest | Dec. 8, 1959 |
| 2,950,543 | Ritter et al. | Aug. 30, 1960 |